United States Patent [19]

Peace et al.

[11] Patent Number: 5,537,275
[45] Date of Patent: Jul. 16, 1996

[54] LEAD SCREW POSITIONING MECHANISM WITH EACH END OF THE LEAD SCREW SELF-ALIGNING AND TILTABLE

[75] Inventors: Steven L. Peace; Warren S. Beitscher, both of Fort Collins; Thomas J. Angellotti; Fred O. Stephens, both of Loveland, all of Colo.

[73] Assignee: Hewlett-Packard Company, Palo Alto, Calif.

[21] Appl. No.: 434,627

[22] Filed: May 4, 1995

Related U.S. Application Data

[63] Continuation of Ser. No. 165,764, Dec. 10, 1993, abandoned.

[51] Int. Cl.$^6$ ............................ G11B 21/02; G11B 21/12; F16H 1/16
[52] U.S. Cl. ........................ 360/106; 360/109; 360/78.02; 74/89.14; 74/89.15
[58] Field of Search .................................... 360/106, 104, 360/109, 77.12, 77.13, 78.02; 74/89.14, 89.15

[56] References Cited

U.S. PATENT DOCUMENTS

| | | | |
|---|---|---|---|
| Re. 33,661 | 8/1991 | Baheri | 360/106 |
| 2,730,369 | 1/1956 | Steed | 369/223 |
| 3,809,827 | 5/1974 | Oyaba | 360/106 |
| 4,071,866 | 1/1978 | Butsch | 360/106 |
| 4,270,155 | 5/1981 | Bejerano | 360/106 |
| 4,302,981 | 12/1981 | Wayman | 74/89.15 |
| 4,313,143 | 1/1982 | Zarr | 360/106 |
| 4,333,116 | 6/1982 | Schoettle et al. | 360/109 |
| 4,346,873 | 8/1982 | Domres | 266/71 |
| 4,609,958 | 9/1986 | Irvin et al. | 360/106 |
| 4,609,959 | 9/1986 | Rudi | 360/106 |
| 4,943,877 | 7/1990 | Cannon et al. | 360/106 |
| 5,132,858 | 7/1992 | Baheri | 360/109 |
| 5,331,490 | 7/1994 | Richards et al. | 360/109 |
| 5,414,578 | 5/1995 | Lian et al. | 360/109 |

FOREIGN PATENT DOCUMENTS

| | | |
|---|---|---|
| 0021326 | 1/1981 | European Pat. Off. . |
| 0243164 | 10/1987 | European Pat. Off. . |
| 3244149 | 5/1984 | Germany . |
| 2-46572 | 2/1990 | Japan . |
| 3-280211 | 12/1991 | Japan . |
| 2078434 | 1/1982 | United Kingdom . |

OTHER PUBLICATIONS

"Feinmechanische Bauelemente", Prof. Dr.–Ing. Siegfried Hildebrand; Carl Hanser Verlag Munchen; 1968, pp. 366–368.
EPO Search Report, Application No. GB9424223.7, P. R. Slater, Mar. 8, 1995.

*Primary Examiner*—Stuart S. Levy
*Assistant Examiner*—David L. Ometz

[57] ABSTRACT

A magnetic head positioning mechanism for a tape backup device includes a carriage carrying the head that has an opening with a substantially conical surface, a guide rod extending through the carriage that restricts translation of the carriage to motion along a predetermined axis, a lead screw extending into the opening in the carriage that is driven by a stepper motor via a gear train, a follower nut threaded on the upper portion of the lead screw for translating the carriage and head along the axis as the lead screw is rotated by the stepper motor, and a spring for urging the carriage into contact with the follower nut. The base end of the lead screw has a conical indentation that contacts and rotates on the rounded end of a protrusion extending from the chassis. The relative positions of this indentation and protrusion can be reversed, if desired. The follower nut includes a rounded (or spherical) surface for contacting the conical surface within the opening in the carriage. The combination of the conical indentation at the base of the lead screw and the rounded surface on the follower nut at the upper portion of the lead screw allows the lead screw to pivot and self-align. This relaxes the required tolerances for alignment and simplifies assembly of the device.

10 Claims, 3 Drawing Sheets

LEAD SCREW POSITIONING MECHANISM WITH EACH END OF THE LEAD SCREW SELF-ALIGNING AND TILTABLE

CROSS REFERENCE TO RELATED APPLICATION

This is a continuation of application Ser. No. 08/165,764 filed Dec. 10, 1993, now abandoned.

BACKGROUND OF THE INVENTION

1. Field of the Invention

The present invention relates generally to the field of magnetic head positioning mechanisms for tape backup devices. More specifically, the present invention discloses a magnetic head positioning mechanism having a self-centering lead screw.

2. Statement of the Problem

In tape backup systems for personal computers, parallel tracks of data are recorded on a tape media in a data cartridge. The magnetic head must be positioned relative to the tracks on the tape such that the head gap centerline is within a prescribed dimensional tolerance of the recorded track center line. In order to maximize the data storage capacity of the tape, the separation between adjacent tracks has been minimized which in turn places severe tolerances on the accuracy of the head positioning system.

The highly competitive nature of the market in personal computer hardware has resulted in a dramatic decline in the price of most components over the past several years. This trend has placed competitive pressure on manufacturers of tape backup systems to continually reduce the costs associated with manufacture and assembly of these devices, without sacrificing performance or reliability. In response, manufacturers have attempted to simplify the mechanical design of tape backup systems to reduce the number and complexity of the components required to assemble each device. This tends to reduce the total cost of the components and also reduces the time and cost associated with assembly of the device. Finally, simpler mechanical designs tend to be more reliable, and therefore reduce warranty and repair costs, and also increase customer satisfaction.

A number of magnetic head positioning mechanisms have been used in the past in tape systems, including the following:

| Inventor | Patent No. | Issue Date |
| --- | --- | --- |
| Zarr | 4,313,143 | Jan. 26, 1982 |
| Cannon et al. | 4,943,877 | July 24, 1990 |
| Baheri | Re. 33,661 | Aug. 13, 1991 |
| Baheri | 5,132,858 | July 21, 1992 |

In U.S. Pat. No. Re. 33,661, Baheri discloses a head positioning assembly in which a magnetic head 14 is mounted on a carriage 20 having a bore 36 therein. The carriage slides along a stationary guide rod 40 extending into the bore. A lead screw 24 is directly driven by a stepper motor 26 and is threaded into a follower nut 76. This nut 76 is keyed to the head carriage so that rotation of the lead screw moves the carriage along the guide rod. A torsion spring 52 engages the carriage and provides a force to bias the carriage so as to eliminate any undesired clearance between the carriage and the follower nut and between the carriage and the guide rod. The spring force is applied at an angle relative to the axis of motion of the carriage. The spring is oriented so that the total force directed parallel to the axis of the motion of the carriage remains constant over its range of motion. The top surface 82 of the follower nut 76 is rounded to allow the carriage to "float" on the nut, or move freely in virtually all directions while still maintaining contact with the follower nut 76.

Zarr discloses a magnetic head positioning mechanism for a multi-track tape cartridge system including a stepper motor 38 that directly drives a lead screw 40. A screw follower 42 threaded on the lead screw is used to incrementally move the head in a direction transverse to the path of the magnetic tape. The follower 42 also includes a projection 44 that interacts with a guide stud 46 so as to allow only linear motion of the follower 42 along the lead screw 40.

Cannon et al. disclose a tape head positioning system for a tape cartridge backup system having a stepper motor 30 with a lead screw 50 and a follower nut 60 threadedly engaging the lead screw. The follow nut has a slot 62 for receiving one end of a lever arm 70. The other end of the lever arm engages in a slot 92 in the head mounting assembly 90 carrying the tape head 150. The lever arm is pivoted about a fulcrum at a predetermined location between its ends. The position of the fulcrum determines the mechanical advantage of the system, thereby allowing an inexpensive, coarser stepper motor to effectuate fine adjustments of the tape head.

In U.S. Pat. No. 5,132,858, Baheri discloses a magnetic head positioner in which the lead screw 12 passes coaxially through a hollow cylindrical tube 13. Two slots are provided through the peripheral wall of the tube. A floating nut 14 is threaded on the lead screw 12 to translate as the lead screw is rotated by the motor assembly. The floating nut 14 is provided with two outwardly extending wings 24, 25 which fit within the slots provided in the tube. A carriage assembly is secured to the magnetic head and includes a tubular structure 26 having two slots. The tubular structure 26 is placed over the slotted tube 13, floating nut 14, and lead screw 12 with the wings 24, 25 of the floating nut 14 extending through the slots and with the closed ends of the slots resting against the wings of the floating nut 13 to maintain the head position in dependence upon the position of the lead screw 12.

None of the prior art references uncovered in the search show a magnetic head positioning mechanism in which the lead screw is supported between its base and the follower nut in a self-centering fashion to minimize the effect of misalignment and to simplify assembly of the device. In particular, both the base of the lead screw and the follower nut threaded on the upper portion of the lead screw are allowed to pivot and self-align. This feature reduces the dimensional tolerances that must be observed in manufacturing the head carriage, follower nut, lead screw, and chassis. It also significantly simplifies assembly and repair of the device and therefore reduces assembly and repair costs.

SUMMARY OF THE INVENTION

This invention provides a magnetic head positioning mechanism for a tape backup device having a self-centering lead screw. In particular, the present invention includes a carriage carrying the head that has an opening with a substantially conical surface, a guide rod extending through the carriage that restricts translation of the carriage to motion along a predetermined axis, a lead screw extending into the opening in the carriage that is driven by a stepper motor via a gear train, a follower nut threaded on the upper portion of the lead screw for translating the carriage and head along the axis as the lead screw is rotated by the stepper motor, and a spring for urging the carriage into contact with the follower nut. The base end of the lead screw has a conical indentation that contacts and rotates on the rounded end of a protrusion extending from the chassis. The relative positions of this indentation and protrusion can be reversed, if desired. The follower nut includes a rounded surface for contacting the conical surface within the opening in the carriage. The combination of the conical indentation at the base of the lead screw and the rounded surface on the follower nut at the upper portion of the lead screw allows the lead screw to pivot and self-align.

A primary object of the present invention is to provide a head positioning mechanism that relaxes the required tolerances for alignment of the lead screw.

Another object of the present invention is to provide a head positioning mechanism that is simple to assemble and repair.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
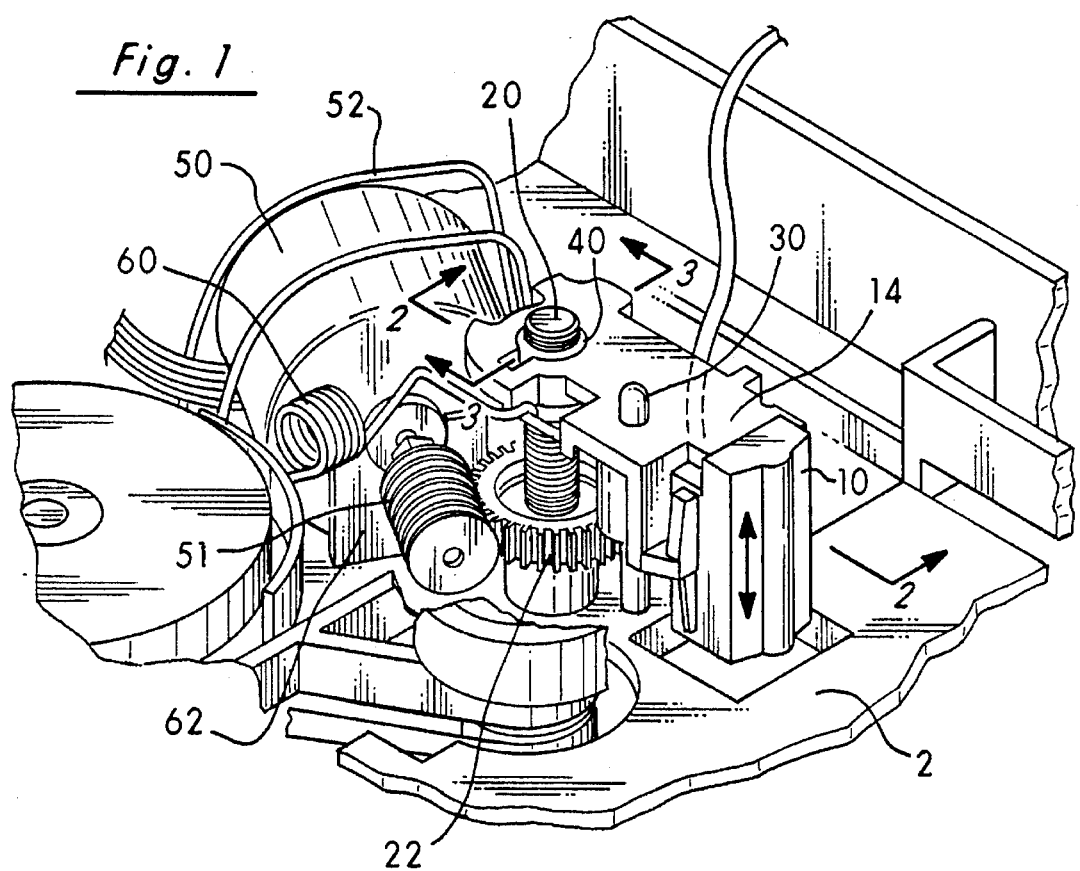
FIG. 1 is a perspective view of the head positioning mechanism.
Figure 2:
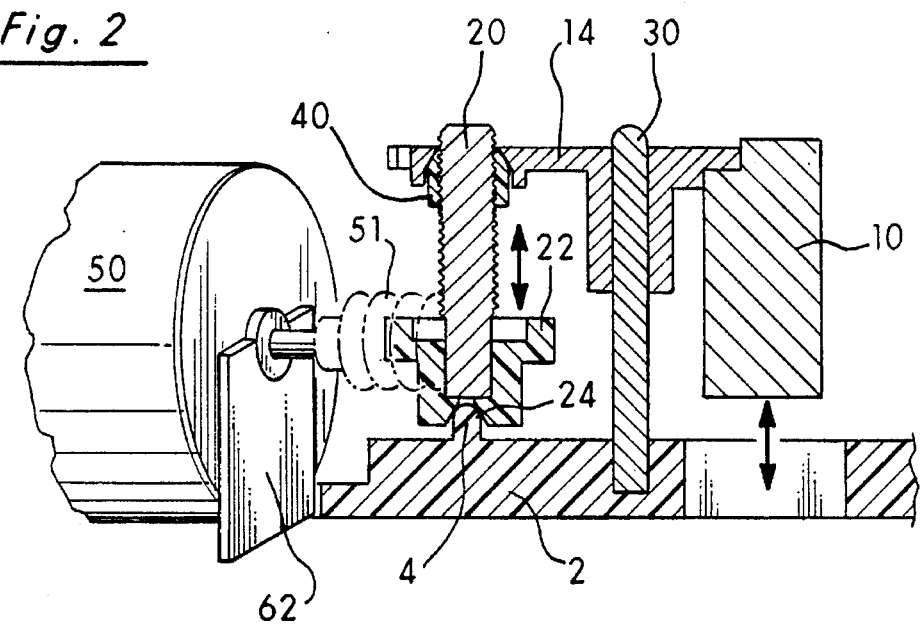
FIG. 2 is a cross-sectional view of the head positioning mechanism corresponding to FIG. 1.

Turning to FIG. 1, an overall perspective view is shown of the head positioning mechanism in a tape backup system. A second perspective view is provided in FIG. 5. FIG. 2 is a corresponding cross-sectional view of the head positioning mechanism.

A magnetic head 10 is used to read and write data on a magnetic tape passing in front of the head in the conventional manner. Since the tape contains many parallel tracks, it is necessary to move the vertical position of the head 10 relative to the tape, as shown by the arrows in FIG. 1. The tape is stored in a removable cartridge that can be inserted into an opening in the front of the unit. A chassis 2 made of molded plastic forms the bottom surface of this opening as partially shown in FIG. 1. The head 10 is permanently bonded to a carriage 14 which can transport the head in the vertical direction. Two openings extend vertically through the carriage 14. The first opening receives the lead screw 20 and follower nut 40 assembly, as will be discussed at length below. The second, smaller opening receives a metal guide rod 30 which extends vertically upward from the chassis 2.

The guide rod 30 freely slides through the second opening with a tight clearance. The purpose of the guide rod 30 is to restrict translation of the carriage 14 and head 10 to the vertical axis defined by the guide rod.

Figure 5:
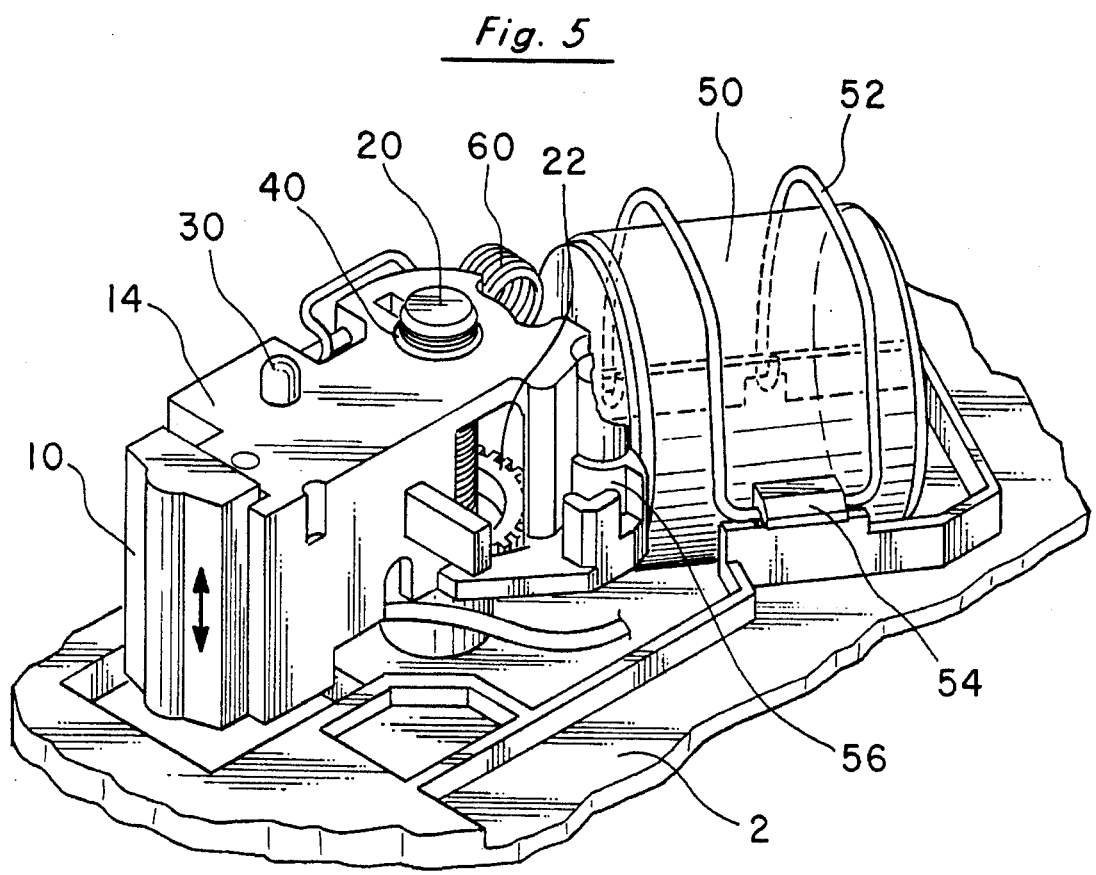
FIG. 5 is another perspective view of the head positioning mechanism showing the clip used to hold the stepper motor to the chassis of the device.

A stepper motor 50 is employed to actuate the positioning mechanism. As shown in FIG. 5, the stepper motor 50 is held in place by a wire clip 52. The clip is shaped to match the contour of the casing for the stepper motor. For example, if the stepper motor 50 has a cylindrical casing, the clip can have a substantially semicircular shape. One side of the clip is hingeably connected to the chassis by means of a number of hook-shaped protrusions extending upward from the chassis 2. Alternatively, one side of the clip can be hingeably connected to the chassis by inserting the ends of the wire clip through a set of small holes in the chassis 2. The stepper motor is positioned on the chassis 2 by means of yokes 62 that contact the motor shaft bushings to define its proper location and orientation relative to the remainder of the head positioning mechanism. The yokes 62 can be molded as integral portions of the chassis 2 that protrude upward from the plane of the remainder of the chassis to minimize manufacturing and assembly costs. The clip 52 is then rotated downward to a position extending over, and in contact with the top of the stepper motor 50. The distal end of the clip is removably secured in place by a number of hook-shaped clasps 54 as shown in FIG. 5.

A worm gear 51 is secured to the drive shaft of the stepper motor 50. This first worm gear 51 drives a second worm gear 22 that has been secured to the lower portion of the lead screw 20. In the preferred embodiment, both worm gears are made of plastic and are simply pressed over the ends of the motor shaft and the lead screw, respectively. The stepper motor can be directed by electrical signals to rotate in either the clockwise or counterclockwise direction. Rotation of the stepper motor therefore causes rotation of the first worm gear 51, which in turn drives the second worm gear 22, resulting in corresponding bidirectional rotation of the lead screw 20.

The upper portion of the lead screw 20 bears threads 21. A follower nut 40 with corresponding threads 43 is threaded onto the upper portion of the lead screw 20. The follower nut includes a number of outwardly extending arms or projections 41 that engage a corresponding channel 18 in the carriage 14 to prevent rotation of the follower nut 40 with respect to the carriage 14 as the lead screw 20 rotates. The arm 41 and channel 18 are shown most clearly in the fragmentary cross-sectional view provided in FIG. 3.

Figure 4:
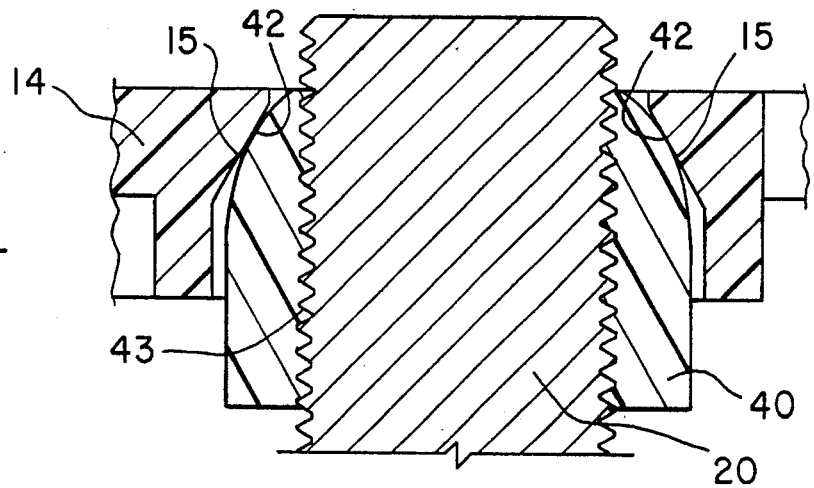
FIG. 4 is a fragmentary cross-sectional view of the upper portion of the lead screw, follower nut, and the opening in the head carriage.

The upper portion of the lead screw 20 and the follower nut 40 extend upward into the first opening through the carriage 14. The upper surface 42 of the follower nut 40 is rounded, as shown in the fragmentary cross-sectional view of FIG. 4. More specifically, in the preferred embodiment, the upper surface 42 has a substantially spherical shape. The inner surface 15 of the first opening has a substantially conical shape. The diameter of the first opening at the lower surface of the carriage 14 is large enough to receive the upper surface 42 of the follower nut 40. However, the diameter of the first opening at the upper surface of the carriage 14 must be small enough to retain the follower nut. As a result, the upper surface 42 of the follower nut 40 contacts the conical surface 15 at some point along the length of the first opening through the carriage 14. Assuming the upper surface 42 of the follower nut 40 has a spherical shape and the first opening has a conical shape, the region of contact between these surfaces is approximated by a circle extending radially about the central vertical axis of the first opening. As the lead screw 20 is rotated by the stepper motor 50, the follower nut 40 rotates on the lead screw 20, and causes the carriage 14 and head to translate in the vertical direction. A torsion spring 60 exerts a downward force on the carriage 14 to maintain contact between the follower nut 40 and the carriage 14 at all times.

The relative motion of the head 10 resulting from each incremental step by the stepper motor 50 is determined by the gear ratio between the first and second worm gears and the pitch of the threads 21 on the upper portion of the lead screw 20. For example, in the preferred embodiment, the stepper motor 50 indexes by 18 degrees per step. The worm gear set has a ratio of 22:1. The upper portion of the lead screw has a #10–48 triple-start thread. These ratios provide a step resolution of approximately 0.000142 inches per step.

Figure 3:
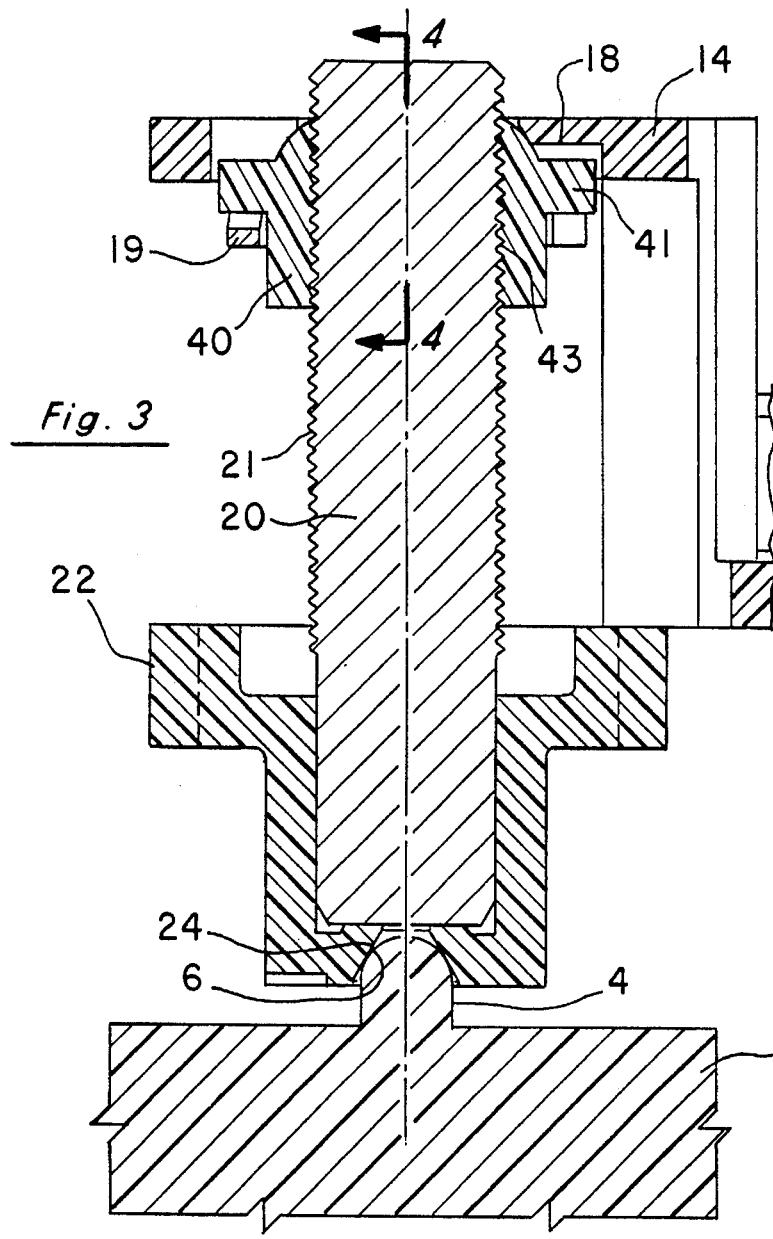
FIG. 3 is a fragmentary cross-sectional view of the lead screw, the worm gear at the base of the lead screw, the follower nut on the upper portion of the lead screw, the protrusion extending upward from the chassis, and the opening in the head carriage.

The head carriage 14 also includes a lip or stop 19, as shown in FIG. 3, that engages the underside of one of the arms 41 projecting from the follower nut 40. During assembly of the device, the follower nut 40 is tipped to one side to allow one of its arms 41 to be inserted above the lip 19. The follower nut 40 is then straightened and the lead screw is threaded through the follower nut to keep it in place. The lip 19 prevents accidental disassembly when lifting upward on the carriage.

The base end of the lead screw 20 is also mounted using a similar self-centering arrangement. A protrusion 4 extends upward from the chassis 2 as illustrated in FIGS. 2 and 3. This protrusion can be formed, for example, as an integral part of the chassis during the molding process. The upper end of the protrusion 4 has a generally rounded or spherical surface 6. In one embodiment, the protrusion is bullet-shaped. An indentation with a conical surface 24 is formed in the base of the lead screw assembly to receive the protrusion 4. This indentation can either be machined into the base of the lead screw 20 or it can be molded as part of the plastic worm gear 22 that is pressed onto the base of the lead screw, as shown in FIG. 3. Here again, the rounded end surface of the protrusion 4 automatically centers itself within the conical indentation 24 at the base of the lead screw assembly. The region of contact is generally limited to a circle extending radially about the vertical axis of the lead screw to minimize friction.

It should be expressly understood that the relative positions of the protrusion 4 and the conical indentation 24 at the base of the lead screw 20 can be readily reversed. A conical indentation could be formed in the chassis and a downwardly extending protrusion with a rounded end surface could be formed on the base end of the lead screw assembly to accomplish the same function.

It should also be expressly understood that other shapes could be substituted for either or both of the two sets of spherical male members and conical female members discussed above. For example, both members could have complementary spherical or conical shapes. However, a combination of one spherical member and one conical member at both locations is advantageous because this arrangement reduces the region of contact to a minimum.

It would also be possible to eliminate the conical surfaces and substitute a cylindrical indentation at the base of the lead screw and a cylindrical first opening through the carriage. In this embodiment, the rounded end of the protrusion 4 would contact only the exposed bottom edge of the cylindrical indentation at the base of the lead screw 20, and the rounded surface of the follower nut 40 would contact only the bottom edge of the first opening through the carriage 14.

The above disclosure sets forth a number of embodiments of the present invention. Other arrangements or embodiments, not precisely set forth, could be practiced under the teachings of the present invention and as set forth in the following claims.

We claim:

1. A magnetic head positioning mechanism comprising:
   a lead screw having an axis of rotation, the lead screw having a base end, the base end having an indented surface;
   a chassis, the chassis having a rounded protrusion, the indented surface of the base end of the lead screw contacting the rounded protrusion on the chassis, thereby aligning the base end of the lead screw relative to the chassis while also enabling the axis of rotation of the lead screw to tilt relative to the chassis;
   a carriage carrying said magnetic head, the carriage having an indented surface; and
   a follower nut threaded onto the lead screw, the follower nut having a rounded surface in contact with the indented surface of the carriage, thereby aligning the lead screw relative to the carriage while also enabling the axis of rotation of the lead screw to tilt relative to the carriage, thereby accommodating any misalignment of the lead screw.

2. The mechanism of claim 1 wherein the indented surface of the base end of the lead screw is substantially conical.

3. The mechanism of claim 1 wherein the indented surface of the carriage is substantially conical.

4. The mechanism of claim 1 wherein the rounded protrusion on the chassis is substantially spherical.

5. The mechanism of claim 1 wherein the rounded surface on the follower nut is substantially spherical.

6. A magnetic head positioning mechanism comprising:
   a lead screw having an axis of rotation, the lead screw having a base end, the base end having a rounded protrusion;
   a chassis, the chassis having an indented surface, the rounded protrusion of the lead screw contacting the indented surface on the chassis, thereby aligning the lead screw relative to the chassis while also enabling the axis of rotation of the lead screw to tilt relative to the chassis;
   a carriage carrying said magnetic head, the carriage having an indented surface; and
   a follower nut threaded onto the lead screw, the follower nut having a rounded surface in contact with the indented surface of the carriage, thereby aligning the lead screw relative to the carriage while also enabling the axis of rotation of the lead screw to tilt relative to the carriage, thereby accommodating any misalignment of the lead screw.

7. The mechanism of claim 6 wherein the indented surface of the chassis is substantially conical.

8. The mechanism of claim 6 wherein the indented surface of the carriage is substantially conical.

9. The mechanism of claim 6 wherein the rounded protrusion on the base end of the lead screw is substantially spherical.

10. The mechanism of claim 6 wherein the rounded surface on the follower nut is substantially spherical.

* * * * *